June 7, 1960 R. W. GRAHAM 2,939,725
FLOW RATIO BLOCKER VALVE FOR AIR SUSPENSION
Filed April 30, 1958
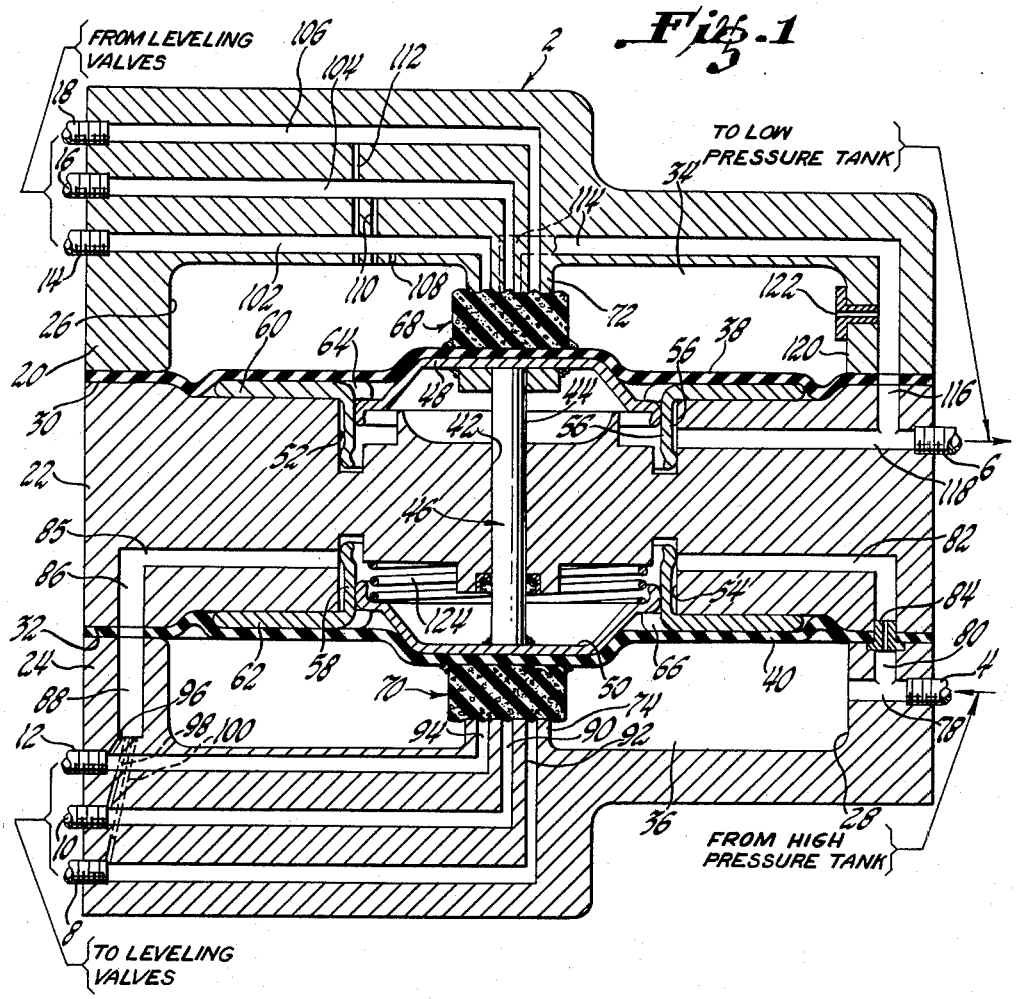
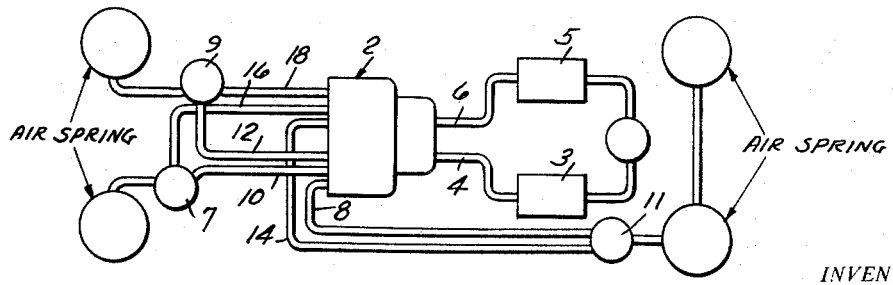
INVENTOR.
Robert W. Graham
BY
W. S. Pettigrew
ATTORNEY

United States Patent Office 2,939,725
Patented June 7, 1960

2,939,725

FLOW RATIO BLOCKER VALVE FOR AIR SUSPENSION

Robert W. Graham, Birmingham, Mich., assignor to General Motors Corporation, Detroit, Mich., a corporation of Delaware Filed Apr. 30, 1958, Ser. No. 731,934

12 Claims. (Cl. 280—124)

This invention relates to vehicle air suspension systems and more particularly to automatic flow control apparatus for use in association with air suspension systems.

In copending application Serial No. 606,155, now Patent No. 2,848,249, dated Aug. 19, 1958, Joseph F. Bertsch et al., assigned to General Motors Corporation, it has been proposed to provide an air suspension system incorporating an orifice controlled diaphragm actuated blocker valve assembly which operates to substantially eliminate air consumption of the system whenever the attitude of the vehicle is such that simultaneous intake of air to one spring and exhaust from another would normally occur. In this system, one diaphragm assembly operates as a function of pressure drop resulting from exhaust flow to automatically block the normal flow path of air in the intake side of the system, while a second diaphragm assembly operates as a function of pressure drop resulting from intake flow to automatically block normal exhaust flow. As a result, when there is a simultaneous requirement for intake of air to one spring and exhaust of air from another, the flow of air in both the intake and exhaust circuits is limited to the amount passing through the associated orifice.

An object of the present invention is to provide an improved air suspension system.

Another object is to provide an improved blocker valve assembly for vehicle air suspension.

A further object is to provide an air suspension system including flow control apparatus which operates as a function of flow ratio between intake flow and exhaust flow of air in the system to control the rate of leveling of the vehicle under various conditions of vehicle attitude.

Still another object is to provide an improved orifice control blocker valve assembly for air suspension systems.

Still a further object is to provide a dual diaphragm air flow control apparatus which automatically regulates operation of a conventional leveling system so as to provide relatively limited flow of air when the ratio of air flow to and from the air springs is approximately equal and to provide marked increase of intake or exhaust air flow rate when the flow ratio becomes unequal.

A still further object is to provide a device of the type described which operates responsive to pressure drop occurring as a result of air flow in the intake and exhaust sides of the system.

Still another object is to provide a device of the stated character including a valve assembly which presents a substantially greater effective area when acted upon by pressure drop tending to move the device to blocking position than the effective area acted upon by pressure tending to move the device to unblocking position.

Yet a further object is to provide a flow ratio sensitive blocker valve assembly for an air suspension system including a first diaphragm assembly actuated responsive to pressure drop resulting from exhaust flow and a second diaphragm assembly actuated responsive to pressure drop resulting from intake flow, the two assemblies being mechanically interconnected so that exhaust pressure drop tends to move the blocker valve from a neutral position blocking both intake and exhaust flow to a position blocking only intake flow, while intake pressure drop tends to move the blocker valve from the neutral position to a position blocking only exhaust flow, wherein the blocker assembly is formed so that less pressure drop is required to restore the valve to neutral than to move it to either unblocking position.

These and other objects, advantages, and features of the invention will become more fully apparent as reference is had to the accompanying specification and drawing wherein:

Fig. 1 is an elevational view in section showing the improved blocker valve assembly.

Fig. 2 is a diagrammatic sketch illustrating an air suspension system incorporating the invention.

In the drawing, the reference numeral 2 designates generally a valve body which is adapted for disposition in the main fluid circuit of any conventional air suspension system, as for example the type shown in copending application Serial No. 606,155, previously referred to. Valve body 2 is connected in communicating relation with high pressure tank 3 by a conduit 4 and with a low pressure tank 5 by a conduit 6. At its opposite side, valve body 2 is connected in communicating relation with the intake and exhaust sides respectively of air spring leveling valves 7, 9 and 11 by conduits 8, 10, 12 and 14; 16, 18.

In the illustrated embodiment, valve body 2 comprises an upper, center, and lower section 20, 22, and 24, respectively, which are assembled in vertical stacked relation. Sections 20 and 24 are each provided with oppositely directed cavities 26 and 28 which cooperate with the upper and lower faces 30 and 32 of center section 22 to provide pressure chambers 34 and 36. Clamped between the abutting faces of sections 20 and 22 is a flexible diaphragm 38, while a second flexible diaphragm 40 is clamped between the abutting faces of section 22 and section 24. Guided in a central vertical bore 42 in section 22 is the stem portion 44 of a valve assembly 46, the opposite ends of which have connected thereto cup-shaped circular members 48 and 50 which abut the respective inner faces of diaphragms 38 and 40. Arranged concentrically around circular members 48 and 50 and guided in annular recesses 52 and 54 of section 22 are a pair of flanged annular ring elements 56 and 58 having radial flanges 60 and 62 which underlie and abut the inner faces of diaphragms 38 and 40. Elements 56 and 58 are provided with radially inwardly extending tangs 64 and 66 which overlie the outer peripheries of cup-shaped members 48 and 50 so that the latter are free to move inwardly independently, but upon outward movement from the position shown in the drawing cause ring members 56 and 58 to move therewith.

Aligned with stem 44 and secured in any suitable manner on the outer face of each diaphragm 38 and 40 are a pair of elastomeric pads 68 and 70 respectively. The overall length of stem 44 and pads 68 and 70 is selected so that the end face of each pad normally exerts a predetermined yielding pressure on the adjacent end face of the adjacent central boss portion 72 and 74 of sections 20 and 24, respectively, for a purpose shortly to be described.

Formed interiorly of section 24 and communicating with intake conduit 4 is a passage 78 which opens into cavity 28. A branch passage 80 extends upwardly from passage 78 and communicates with an axially aligned portion of a passage 82 formed in section 22. Disposed at the juncture of passages 80 and 82 in the plane of diaphragm 40 is a metering orifice 84, the purpose of which will be described shortly. Passage 82 extends transversely through section 22 and opens into the annular recess 54 formed therein. At its opposite side, section 22 is formed with a second transverse passage 85 having a depending vertical portion 86 which is aligned with a vertical passage 88 formed in lower section 24. Extending downwardly through boss portion 74 are three vertical passages 90, 92, and 94 having transversely extending portions which communicate respectively with conduits 10, 8 and 12 leading to the intake sides of the leveling valves, not shown. In addition to the direct connection with the relatively large bore passages 90, 92, and 94, conduits 8, 10, and 12 are arranged in communication with passage 88 by means of small bore passages 96, 98, and 100.

Upper section 20 in turn is provided with three transverse passages 102, 104, and 106 which are connected to exhaust conduits 14, 16, and 18, respectively. At their inner ends, passages 102, 104, and 106 extend downwardly through boss 72 and open into cavity 26. In addition to the relatively large bore passages 102, 104, and 106, communication between conduits 14, 16, and 18 and cavity 26 is also provided by small bore passages 108, 110, and 112. Boss 72 is also provided with an additional vertically extending passage 114, a portion of which extends transversely to a second vertical portion aligned with a vertical passage 116 formed in center section 22. Passage 116 in turn communicates with a transverse passage 118, the inner end of which opens into annular recess 52, while the outer end is connected to conduit 6 leading to the low pressure tank. Formed in the wall 120 of upper section 20 is an orifice 122 which provides direct communication between cavity 26 and passage 114.

In operation, the device just described functions in the following manner. When the vehicle is in the normal level attitude, such that the flow of air to the springs equals the flow of air from the springs, closures 68 and 70 remain in the position shown in the drawings thereby blocking movement of air from conduit 4 through passages 90, 92, and 94 to intake conduits 8, 10, and 12 and from exhaust conduits 14, 16, and 18 through passages 102, 104, and 106 to conduit 4. While the pressure in the intake conduits will normally be greater than the pressure in the exhaust conduits, the pressure differential is counterbalanced by coil spring 124 disposed between cup 50 and the base of section 22. Accordingly, movement of air from the leveling valves to the low pressure tank must flow through small bore passages 108, 110, and 112, while movement of air to the leveling valves from the high pressure tank must flow through small bore passages 96, 98, and 100. As long as intake and exhaust flow rate occurs at substantially a 1:1 ratio (flow in:flow out), pressure drop measured across intake orifice 84 and exhaust orifice 122 will be substantially equal and the position of diaphragms 38 and 40 will remain unaffected. However, if a load, however slight, is added or removed from the sprung portion of the vehicle, the flow ratio approaches zero or infinity since one of the factors of the ratio will equal zero flow. For example, if a load is applied, the flow ratio will become much larger than 1:1, while removal of load will produce a much smaller ratio than 1:1. In the first instance, closure 70 will be unseated providing direct communication between passage 78 and each of passages 90, 92, and 94 thereby permitting fast flow of air to the leveling valves. In the second instance, the closure 68 is unseated providing direct communication between passages 102, 104, and 106 and passage 118 leading to the low pressure tank thereby allowing rapid exhaust of air from the leveling valves. In each instance, it will be noted that unseating of one closure results in increased closing pressure on the other closure by virtue of the interconnecting stem 44. This axial displacement of stem 44 causes one of the cup-shaped members 48 and 50 to be moved inwardly with respect to center section 22, while the other is moved outwardly relative thereto. Taking, for example, the condition occurring upon unseating of closure 70, it will be seen that cup-shaped member 50 moves toward center section 22, while cup-shaped member 48 moves away from center section 22. Because of the one-way overlapping relationship of ring member 56, the latter is also moved upwardly with member 48. As a result, as soon as fast flow leveling induces overshooting, the exhaust side of each leveling valve immediately opens, creating a marked pressure drop measured across orifice 122. Upon this occurrence, even though the pressure drop across orifice 122 may not be as great as the pressure drop already occurring across orifice 84 as a result of fast intake flow, closure 70 will be snapped to closed position due to the fact that the area acted upon by diaphragm 38 is greater than the area acted upon by diaphragm 40. In the case just described, the area acted upon by diaphragm 40 to unseat closure 70 is equal to the effective area of cup-shaped member 50, while the effective area acted upon by diaphragm 38 to return closure 70 to blocking position is the sum of the areas of cup-shaped member 48 and the radial flange 60 of ring element 56. As will be noted from the drawing, the added area provided by flange 60 or 62 is effective only in restoring the valve assembly to the neutral blocking position since further inward movement of the ring is arrested by engagement with the face of center section 22. It will now be seen that a greater pressure drop is always required to unseat either closure 68 or 70 than is required to keep it seated. As a result, the valve assembly seeks a quiescent state of flow of air to and from the leveling valves which tends to prevent hunting due to time lag, floating conditions produced by undulating roads, and other moderate disturbances. In addition, the device inherently tolerates normal manufacturing variations in orifice sizes, effective areas, etc.

While but one embodiment of the invention has been shown and described, it will be apparent that other changes and modifications may be made therein. It is, therefore, understood that it is not intended to limit the invention to the embodiment shown, but only by the scope of the claims which follow.

I claim:

1. Control means for a pneumatic suspension system having a source of air pressure, means for exhausting air from the system, a plurality of air springs in the circuit between said source and said exhaust means, said circuit including a pressure line from said source to each spring, and an exhaust line from each spring to said exhaust means, said control means comprising a master valve through which all air from said source and to said exhaust means flows, said master valve including a pressure section and an exhaust section, said pressure section receiving air from said source and having an outlet to said springs incorporating normally closed passage means and a by-pass restriction orifice, said exhaust section receiving air from said springs and having an outlet to said exhaust means incorporating similar normally closed passage means and restriction orifice, each of said sections including elements actuated by pressure drop across the corresponding restriction orifice to open the associated normally closed passage thereby increasing the flow rate to or from the springs.

2. Control means for a pneumatic suspension system having a source of air pressure, means for exhausting air from the system, a plurality of air springs in the circuit between said source and said exhaust means, said circuit including a pressure line from said source to each spring, and an exhaust line from each spring to said exhaust means, said control means comprising a master valve through which all air from said source and to said exhaust means flows, said master valve including a pressure section and an exhaust section, said pressure section receiving air from said source and having an outlet to said springs incorporating normally closed passage means and a by-pass restriction orifice, said exhaust section receiving air from said springs and having an outlet to said exhaust means incorporating similar normally closed passage means and restriction orifice, each of said sections including elements actuated by pressure drop across the corresponding restriction orifice to open the associated normally closed passage thereby increasing the flow rate to or from the springs, said elements being positively interconnected so that opening of one normally closed passage prevents concurrent opening of the other normally closed passage.

3. Control means for a pneumatic suspension system having a source of air pressure, means for exhausting air from the system, a plurality of air springs in the circuit between said source and said exhaust means, said circuit including a pressure line from said source to each spring, and an exhaust line from each spring to said exhaust means, said control means comprising a master valve through which all air from said source and to said exhaust means flows, said master valve including a pressure section and an exhaust section, said pressure section receiving air from said source and having an outlet to said springs incorporating normally closed passage means and a by-pass restriction orifice, said exhaust section receiving air from said springs and having an outlet to said exhaust means incorporating similar normally closed passage means and restriction orifice, each of said sections including diaphragm operated elements actuated by pressure drop across the corresponding restriction orifice to open the associated normally closed passage thereby increasing the flow rate to or from the springs, said elements being positively interconnected so that opening of one normally closed passage prevents concurrent opening of the other normally closed passage.

4. Control means for a pneumatic suspension system having a source of air pressure, means for exhausting air from the system, a plurality of air springs in the circuit between said source and said exhaust means, said circuit including a pressure line from said source to each spring, and an exhaust line from each spring to said exhaust means, said control means comprising a master valve through which all air from said source and to said exhaust means flows, said master valve including a pressure section and an exhaust section, said pressure section receiving air from said source and having an outlet to said springs incorporating normally closed passage means and a by-pass restriction orifice, said exhaust section receiving air from said springs and having an outlet to said exhaust means incorporatnig similar normally closed passage means and restriction orifice, each of said sections including diaphragm operated elements actuated by pressure drop across the corresponding restriction orifice to open the associated normally closed passage thereby increasing the flow rate to or from the springs, said elements being positively interconnected so that opening of one normally closed passage prevents concurrent opening of the other normally closed passage, and means associated with each of said interconnected elements causing the latter to be differentially responsive to pressure exerted by the associated diaphragm, whereby a greater pressure drop is required across one orifice to move the associated element to passage opening position than the pressure drop required across the other orifice to return the element to closed position.

5. In a pneumatic suspension system of the type including a plurality of air springs, a high pressure circuit, an exhaust circuit, and height responsive leveling means for introducing and exhausting air from the springs, flow control apparatus comprising a master valve through which all pressure and exhaust air flow, said master valve including a pressure section and an exhaust section, a flexible diaphragm partition for each of said sections, pressure inlet means communicating directly with one side of said pressure section, an orifice providing restricted communication between said inlet and the other side of said section, exhaust outlet means communicating directly with one side of said exhaust section, an orifice providing restricted communication between the other side of said section and said outlet, pressure outlet means to said springs arranged to communicate with both sides of said pressure section, exhaust inlet means from said springs arranged to communicate with both sides of said exhaust section, and a pressure responsive valve assembly disposed between said sections including closure means normally blocking communication between the respective outlet and inlet means of said pressure and exhaust sections with the respective sides of said pressure and exhaust sections having direct communication with said pressure inlet means and said exhaust outlet means, said valve assembly being actuated in one direction by pressure drop across the restriction orifice in the pressure section and in the other direction by pressure drop across the restriction orifice in the exhaust section.

6. The invention claimed in claim 5 wherein said closure means is capable of absorbing substantial compressive deformation.

7. In a device of the class described, a valve body having a pair of spaced cavities, a flexible diaphragm partition in each cavity, a plunger slidably disposed in said body between said diaphragms, a piston connected at either end of said plunger abutting the adjacent diaphragm, closure means at either end of each plunger normally biasing the latter to a neutral central position, and an auxiliary member associated with each piston in one-way overlapping engagement whereby pressure exerted on either diaphragm displaces the adjacent piston inwardly independently of its associated auxiliary member, and the other piston outwardly concurrently with its associated member.

8. In a device of the class described, a valve body having a pair of spaced cavities, a flexible diaphragm partition in each cavity, a plunger slidably disposed in said body between said diaphragms, a piston connected at either end of said plunger abutting the adjacent diaphragm, closure means secured to each diaphragm at either end of each plunger normally biasing the latter to a neutral central position, and an auxiliary member associated with each piston in one-way overlapping engagement whereby pressure exerted on either diaphragm displaces the adjacent piston inwardly independently of its associated auxiliary member, and the other piston outwardly concurrently with its associated member.

9. In a device of the class described, a valve body having a pair of spaced cavities, a flexible diaphragm partition in each cavity, a plunger slidably disposed in said body between said diaphragms, a circular piston connected at either end of said plunger abutting the adjacent diaphragm, closure means secured to each diaphragm at either end of each plunger normally biasing the latter to a neutral central position, and an auxiliary member associated with each piston in one-way overlapping engagement whereby pressure exerted on either diaphragm displaces the adjacent piston inwardly independently of its associated auxiliary member, and the other piston outwardly concurrently with its associated member.

10. In a device of the class described, a valve body having a pair of spaced cavities, a flexible diaphragm partition in each cavity, a plunger slidably disposed in said body between said diaphragms, a circular piston connected at either end of said plunger abutting the adjacent diaphragm, closure means secured to each diaphragm at either end of each plunger normally biasing the latter to a neutral central position, and an annular auxiliary member associated with each piston in one-way overlapping engagement whereby pressure exerted on either diaphragm displaces the adjacent piston inwardly independently of its associated auxiliary member, and the other piston outwardly concurrently with its associated auxiliary member.

11. The structure set forth in claim 7 wherein said auxiliary members in outwardly displaced position increase the effective area of the associated piston acted on by the adjacent diaphragm.

12. The structure set forth in claim 8 including a fluid circuit associated with each cavity, and orifice means in each circuit for inducing a pressure differential on opposite sides of the associated diaphragm responsive to fluid flow in said circuit.

References Cited in the file of this patent

UNITED STATES PATENTS

| | | |
|---|---|---|
| 1,858,291 | Burdett | May 17, 1932 |
| 2,775,980 | Renaude | Jan. 1, 1957 |
| 2,848,249 | Bertsch | Aug. 19, 1958 |